United States Patent
Akutsu et al.

(10) Patent No.: US 8,896,711 B2
(45) Date of Patent: Nov. 25, 2014

(54) ANTI-VIBRATION ACTUATOR AND LENS UNIT AND CAMERA FURNISHED WITH SAME

(71) Applicant: Tamron Co., Ltd., Saitama-shi, Saitama (JP)

(72) Inventors: Toshinori Akutsu, Saitama (JP); Atsushi Shimane, Koshigaya (JP); Shouko Koeda, Saitama (JP)

(73) Assignee: Tamron Co., Ltd., Saitama (JP)

( * ) Notice: Subject to any disclaimer, the term of this patent is extended or adjusted under 35 U.S.C. 154(b) by 162 days.

(21) Appl. No.: 13/645,297

(22) Filed: Oct. 4, 2012

(65) Prior Publication Data
US 2013/0088607 A1    Apr. 11, 2013

(30) Foreign Application Priority Data
Oct. 7, 2011 (JP) .................................. 2011-222816

(51) Int. Cl.
*H04N 5/228* (2006.01)
*G02B 27/64* (2006.01)
*H02K 41/035* (2006.01)
*G03B 5/00* (2006.01)
*G03B 17/14* (2006.01)

(52) U.S. Cl.
CPC .......... *G03B 5/00* (2013.01); *G03B 2205/0015* (2013.01); *H02K 41/0356* (2013.01); *G03B 17/14* (2013.01)
USPC .................. 348/208.11; 348/208.99; 359/554

(58) Field of Classification Search
None
See application file for complete search history.

(56) References Cited

U.S. PATENT DOCUMENTS

| | | | |
|---|---|---|---|
| 2007/0127907 A1* | 6/2007 | Iwasaki et al. | 396/144 |
| 2007/0206934 A1* | 9/2007 | Ishii et al. | 396/55 |
| 2008/0187301 A1* | 8/2008 | Takahashi | 396/55 |
| 2011/0013029 A1 | 1/2011 | Akutsu et al. | |
| 2011/0182566 A1* | 7/2011 | Watanabe | 396/55 |

FOREIGN PATENT DOCUMENTS

JP    2011-022269    2/2011

* cited by examiner

*Primary Examiner* — Justin P Misleh
(74) *Attorney, Agent, or Firm* — Westerman, Hattori, Daniels & Adrian, LLP

(57) ABSTRACT

The present invention is an anti-vibration actuator (10) for moving an image stabilizing lens (16), having: a fixed portion (12); a movable portion (14) to which an image stabilizing lens is attached; a movable support member (18) for supporting this movable portion so that it is movable within a plane perpendicular to the optical axis of the image stabilizing lens; drive coils (20) attached to one of either the fixed portion or the movable portion; drive magnets (22) attached to the other of either the fixed portion or the movable portion so as to respectively face these drive coils; and at least one yoke (26) disposed on the side of the drive coils not facing the drive magnets; whereby magnetic force suppressing cutouts (26a) are provided on the yoke in a position overlapping the drive coils in order to suppress magnetic force received from the drive coils.

9 Claims, 7 Drawing Sheets

ANTI-VIBRATION ACTUATOR AND LENS UNIT AND CAMERA FURNISHED WITH SAME

CROSS-REFERENCE TO RELATED APPLICATIONS

The present patent application claims priority from Japan Application No. 2011-222816, filed Oct. 7, 2011, which is incorporated herein by reference in its entirety.

TECHNICAL FIELD

The present invention relates to an anti-vibration actuator, and more particularly to an anti-vibration actuator for moving an image stabilizing lens, and to a lens unit and camera furnished with same.

BACKGROUND ART

An anti-vibration actuator is set forth in Published Unexamined Patent Application 2011-22269 (Patent Citation 1). In this anti-vibration actuator, an image stabilizing lens is attached to a moving frame, and three drive magnets are attached to this moving frame. At the same time, three drive coils are attached to a fixed plate so as to face each of the drive magnets. Three steel balls are placed between the moving frame and the fixed plate, and by these three steel balls the moving frame is supported so as to be movable within a plane perpendicular to the optical axis. Furthermore, by sourcing current to the drive coil, a drive force is generated between the mutually facing drive magnets, and the moving frame can be moved in a predetermined direction. Note that the magnetism applied to the drive magnets is selected so that a predetermined drive force can be obtained between the drive magnets and the drive coils.

Furthermore, the pulling yokes are disposed on the rear side of the drive coils, i.e., the side of the drive coil facing the drive magnets. The moving frame is pulled to the fixed plate by the magnetic force acting between this pulling yoke and the drive magnet. Through the pulling of the moving frame to the fixed plate, the three steel balls placed between the moving frame and the fixed plate are sandwiched and held therebetween.

PRIOR ART DOCUMENT

Patent Document

Patent Document 1

Published Unexamined Patent Application JP2011-22269

SUMMARY OF THE INVENTION

Problems the Invention Seeks to Resolve

However, the problem arises that the magnetic force acting between the pulling yoke (yoke) and the drive magnet affects the operation of an anti-vibration actuator. I.e., to generate a large drive force between a drive magnet and a drive coil requires imparting strong magnetism to the drive magnet. In particular, in recent years such image stabilizing lenses which require driving have been growing in size, such that the magnetism imparted to the drive magnets has also grown. This is accompanied by an increase in the magnetic force (pulling force) acting between the drive magnet and the yoke, and various problems arise because this magnetic force is too large.

First, in an actuator of the type in which a moving frame is supported by ball bearings, the problem can arise that the contact pressure between the interposed balls, the moving frame, and the fixed plate becomes excessive, causing wear of contact surfaces. The magnetic force acting on the drive magnets and the yoke includes not only a component causing it to pull the moving frame in the optical axis direction, but also a component in the direction perpendicular to the optical axis. Such a force component acting within a plane perpendicular to the optical axis overlaps the drive force generated between the drive magnets and the drive coils, becoming a disturbance to the control driving the moving frame. When driving the moving frame, a drive force capable of overcoming the magnetic force between the drive magnets and the yoke must be generated, leading to the problem of increased current to the drive coils, wasting electrical power.

Furthermore, reducing the thickness of the steel plate or the like forming the yoke is a conceivable way to weaken the magnetic force acting between the drive magnets and the yoke, but the magnetic force cannot be sufficiently weakened using steel plates or the like in commercially readily available thicknesses. Increasing the distance of the yoke from the drive magnets in the optical axis direction is another conceivable way to weaken the magnetic force acting between the drive magnets and the yoke, but the problem then arises that the anti-vibration actuator size increases due to distancing of the yoke.

Therefore the present invention has the object of providing an actuator and lens unit and camera equipped therewith capable of controlling the magnetic force acting between drive magnets and a yoke, while avoiding an increase in size.

Means for Resolving the Problem

In order to resolve the above-described problems, the present invention is an anti-vibration actuator for moving an image stabilizing lens, comprising: a fixed portion; a movable portion to which the image stabilizing lens is attached; a movable portion supporting member that supports the movable portion so that it is movable relative to the fixed portion within a plane perpendicular to the optical axis of the image stabilizing lens; drive coils attached to one of either the fixed portion or the movable portion; drive magnets attached to the other of either the fixed portion or the movable portion so as to respectively face the drive coils; and at least one yoke attached to the side of the drive coil not facing the drive magnet; wherein the yoke includes magnetic force suppressing cutout portions formed in a position overlapping the drive coils to suppress magnetic force received from the drive magnet.

In the present invention thus constituted, the movable portion to which the image stabilizing lens is attached is supported by a movable portion supporting member so as to be movable within a plane perpendicular to the optical axis of the image stabilizing lens. Drive coils are attached to one of either the fixed portion or the movable portion, and drive magnets are attached to the other of either the fixed portion or the movable portion so as to respectively face the drive coils. Furthermore, at least one yoke is disposed on the side of the drive coils not facing the drive magnets, and magnetic force suppressing cutout portions placed at a position overlapping the drive coil suppresses magnetic force received from the drive magnets.

In the present invention thus constituted, magnetic force suppressing cutout portions suppress magnetic force received from the drive magnets, therefore magnetic forces acting between the drive magnets and the yokes can be suppressed while avoiding an enlargement of the anti-vibration actuator.

The present invention preferably further has a position detecting magnetic sensor disposed on the inside of the drive coils, and the magnetic force suppressing cutout portions are disposed in a position not overlapping the magnetic sensor.

In the present invention thus constituted, the magnetic force suppressing cutout portions are provided at a position not overlapping the magnetic sensor, therefore position detection can be performed by the magnetic sensor with good sensitivity and without large suppression of the magnetism which the magnetic sensor is to detect.

In the present invention the magnetic force suppressing cutout portions are preferably provided along a straight line perpendicular to the line of action of the drive force acting between the corresponding drive coil and the drive magnets facing this drive coil.

In the present invention thus constituted, the magnetic force suppressing cutout portions are provided along a straight line perpendicular to the drive force line of action, therefore magnetic forces acting in the direction of the drive force within a plane perpendicular to the optical axis can be effectively suppressed, and interference with control of the movable portion can be reduced.

In the present invention, each of the drive magnets preferably has a magnetic polarity boundary line extending within a plane perpendicular to the optical axis of the image stabilizing lens, and magnetic force suppressing cutout portions are provided along the magnetic polarity boundary lines of each drive magnet.

In the present invention thus constituted, the magnetic force suppressing cutout portions are provided along the magnetic polarity boundary lines of the drive magnets, therefore a portion at which a strong magnetic field is easily formed within the yoke is cut away, and magnetic force can be effectively suppressed.

In the present invention the magnetic force suppressing cutout portions are preferably constituted of multiple holes disposed along the magnetic polarity boundary line of each drive magnet.

In the present invention thus constituted, the magnetic force suppressing cutout portions along the magnetic polarity boundary line of the drive magnets can be easily machined.

In the present invention, at least two of the multiple drive magnets are preferably disposed so that the magnetic polarity boundary lines thereof face in a direction tangential to a circle centered on the optical axis, and the magnetic force suppressing cutout portions are constituted by multiple holes disposed along a direction tangential to the circle so as to follow the magnetic polarity boundary line.

In the present invention, at least three of the multiple drive magnets are preferably disposed so that the magnetic polarity boundary lines thereof face in a direction radial to a circle centered on the optical axis, and the magnetic force suppressing cutout portions are constituted by multiple holes disposed along the radial direction of the circle so as to follow the magnetic polarity boundary line.

The present invention is a lens unit equipped with an anti-vibration actuator, having a lens barrel, an image capturing lens disposed within this lens barrel, and the anti-vibration actuator of the present invention.

The present invention is furthermore a camera furnished with an anti-vibration actuator, having a camera main body, and the lens unit of the present invention.

Effect of the Invention

Therefore using the anti-vibration actuator and lens unit and camera furnished therewith of the present invention, magnetic forces between drive magnets and the yoke can be suppressed while avoiding an increase in size.

EMBODIMENTS OF THE INVENTION

Next, referring to the attached figures, we discuss an embodiment of the present invention.

Figure 1:
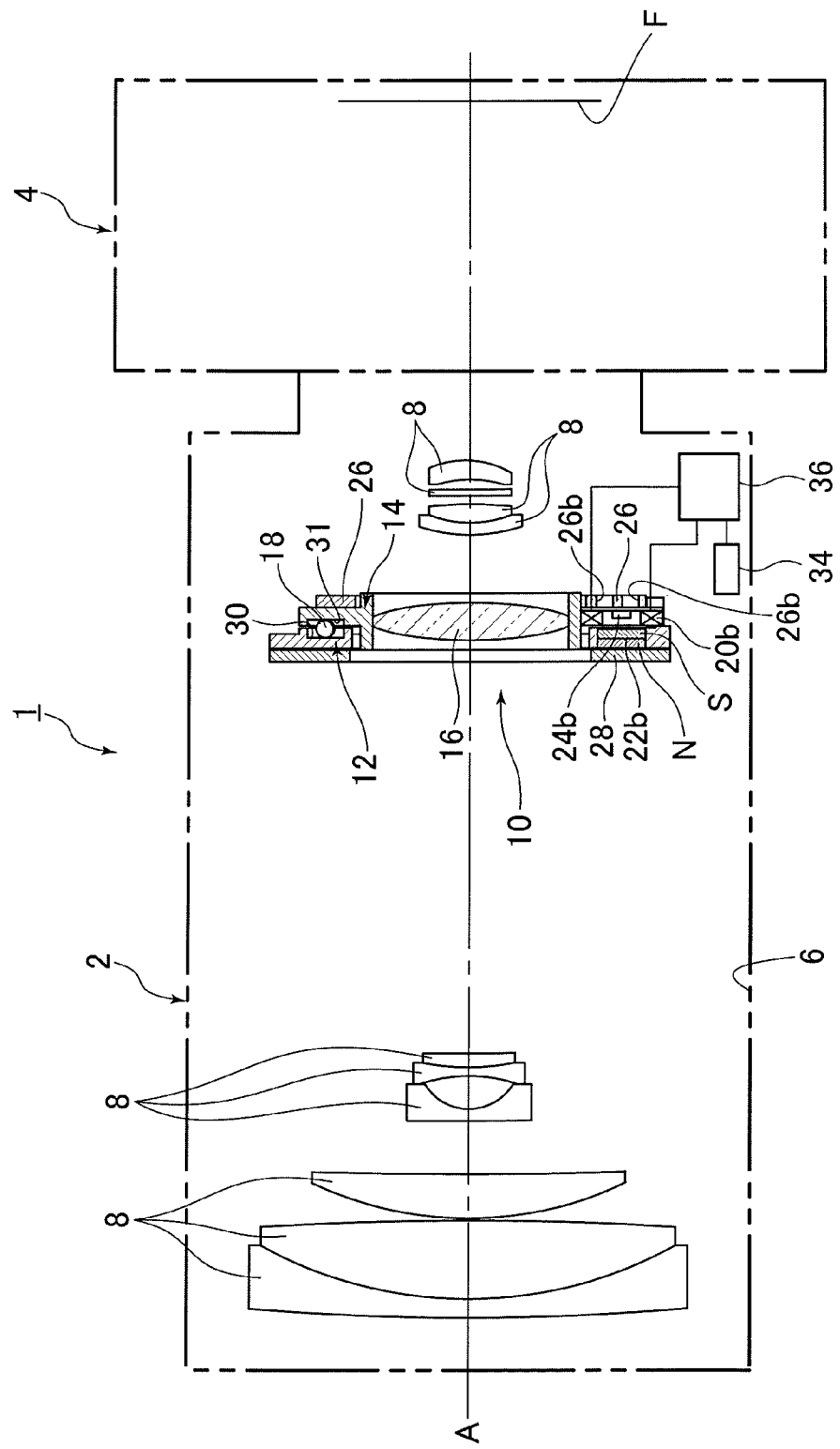
FIG. 1 A cross section of a camera according to a first embodiment of the present invention.

First, referring to FIGS. 1 through 5, we discuss a camera according to a first embodiment of the present invention. FIG. 1 is a cross section of a camera according to an embodiment of the present embodiment.

As shown in FIG. 1, camera 1 of the first embodiment of the present invention has a lens unit 2 and a camera main body 4. The lens unit 2 has a lens barrel 6, multiple image capturing lenses 8 disposed within this lens barrel, an anti-vibration actuator 10 for moving the image stabilizing lenses 16 within a predetermined plane, and a gyro 34 serving as vibration detection means for detecting vibration of the lens barrel 6.

The embodied camera 1 of the present invention detects vibration using the gyro 34, actuates the anti-vibration actuator 10 based on the detected vibration to move the image stabilizing lens 16, thus stabilizing the image focused on film surface F within the camera body 4. In the present embodiment, a piezo-electric gyro is used as the gyro 34. Note that in the present embodiment the image stabilizing lens is constituted as a single lens, but the lens for stabilizing images can also be a group of multiple lenses. In the present Specification, "image stabilizing lens" includes single lenses and lens sets for stabilizing images.

The lens unit 2 is attached to the camera body 4 to focus incident light on the film surface F.

The approximately cylindrical lens barrel 6 holds within it multiple image capturing lenses 8, and focus can be adjusted by moving a portion of the image capturing lenses 8.

Figure 2:
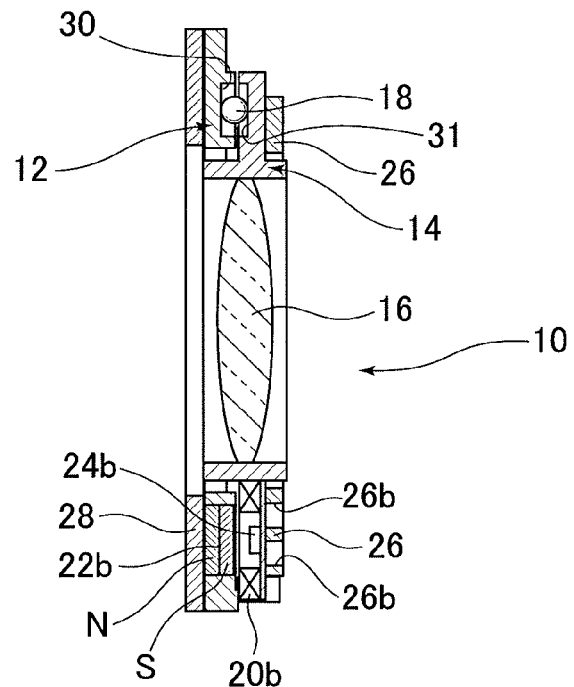
FIG. 2 A side elevation cross section showing an expanded view of an anti-vibration actuator built into a lens unit.
Figure 3:
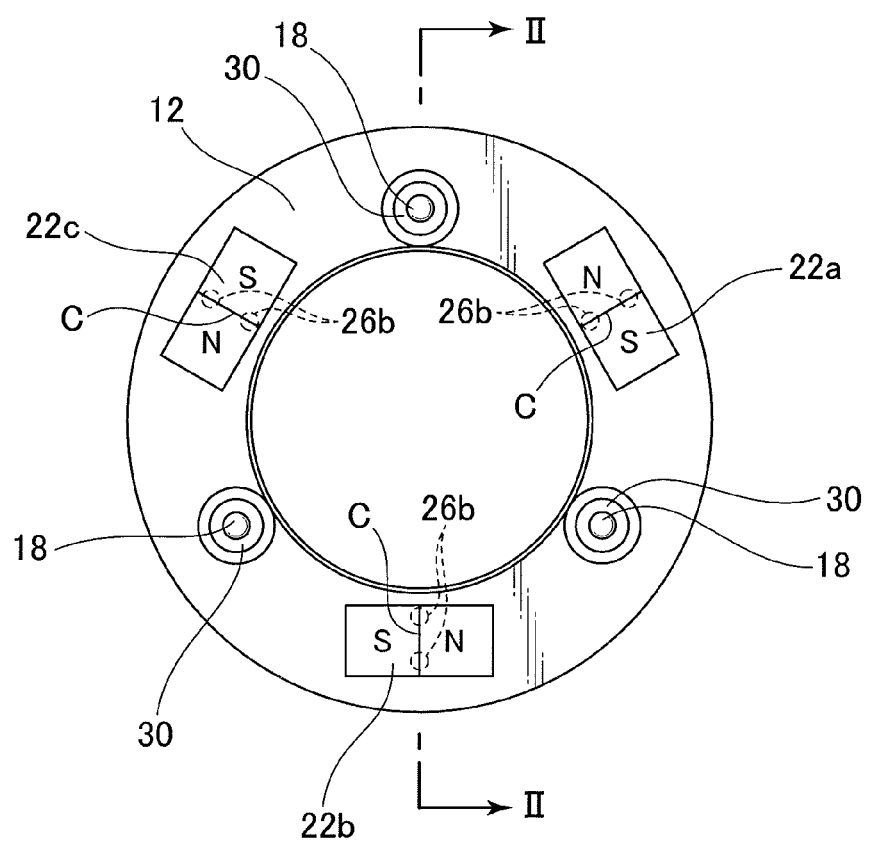
FIG. 3 A rear elevation diagram in which the movable portion of the anti-vibration actuator is removed.
Figure 4:
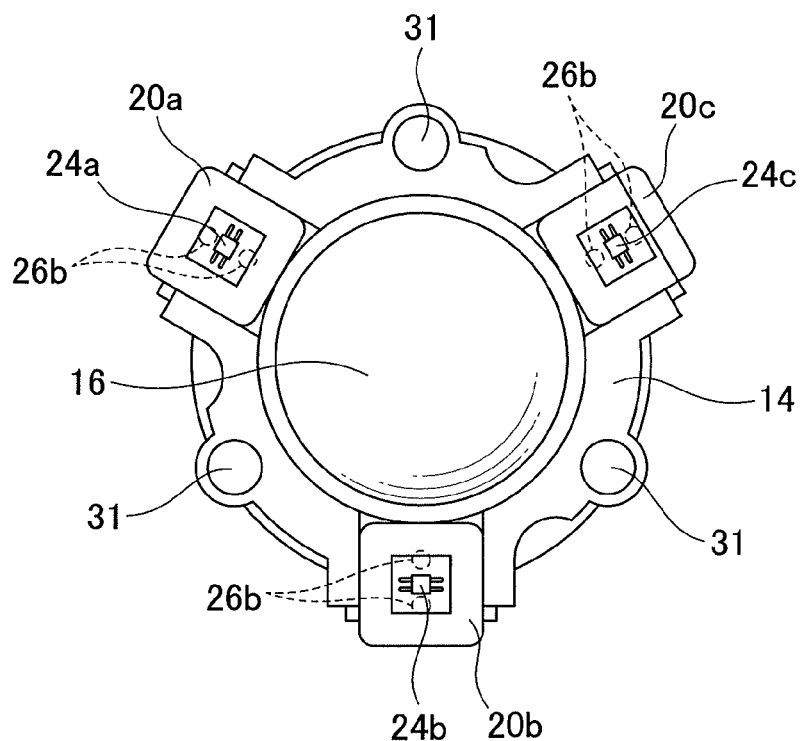
FIG. 4 A front elevation of the movable portion of the anti-vibration actuator.
Figure 5:
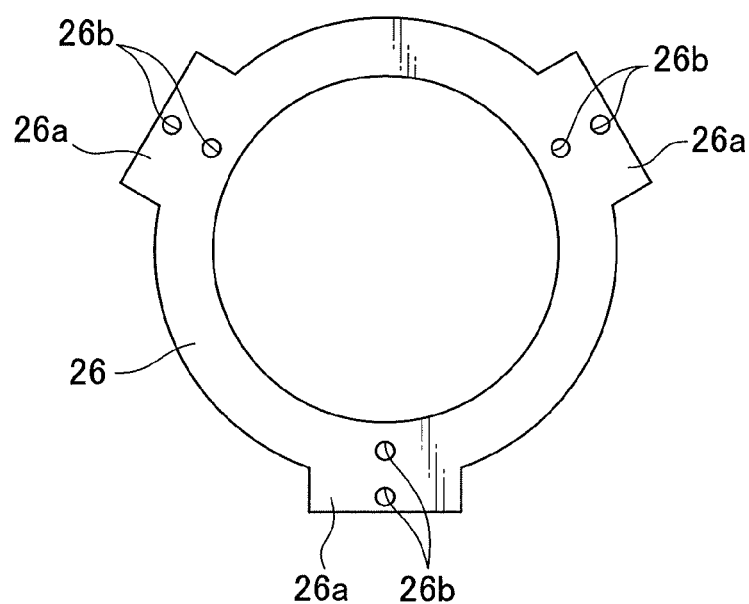
FIG. 5 A front elevation of the pulling yoke attached to the movable portion of the anti-vibration actuator.

Next, referring to FIGS. 2 through 5, we discuss the anti-vibration actuator 10. FIG. 2 is a side elevation cross section showing an expanded view of an anti-vibration actuator 10 built into a lens unit 2. FIG. 3 is a rear elevation showing the state in which the movable portion of the anti-vibration actuator 10 has been removed; FIG. 4 is a front elevation of the movable portion of the anti-vibration actuator 10. FIG. 5 is a front elevation of the pulling yoke attached to the movable portion of the anti-vibration actuator 10. Note that FIG. 2 is a cross section showing the anti-vibration actuator 10 split along line II-II in FIG. 3.

As shown in FIGS. 2 through 5, the anti-vibration actuator 10 has an affixing plate 12, being a fixed portion affixed within the lens barrel 6, a moving frame 14, being a movable portion, supported so as to be translationally and rotationally movable with respect to the affixing plate 12, and three steel balls 18, being movable portion supporting member for supporting the moving frame 14. Moreover, the anti-vibration actuator 10 has a first drive coil 20a, a second drive coil 20b, and a third drive coil 20c attached to the moving frame 14; a first drive magnet 22a, second drive magnet 22b, and third drive magnet 22c attached at positions respectively facing the first drive coils 20a, 20b, and 20c of the fixed plate 12; and a first magnetic sensor 24a, second magnetic sensor 24b, and third magnetic sensor 24c serving as first, second, and third position detecting elements respectively disposed inside each of the drive coils 20a, 20b, and 20c.

In addition, the anti-vibration actuator 10 has a pulling yoke 26, which is a yoke attached to the reverse side of the moving frame 14 for pulling the fixed plate 12 to the moving frame 14 using the magnetic force of each drive magnet, and a back yoke 28 attached to the opposite side surface of each drive magnet so as to effectively direct the drive force of each drive magnet toward the moving frame 14. Note that the first drive coil 20a, second drive coil 20b, and third drive coil 20c, and the first drive magnet 22a, second drive magnet 22b, and third drive magnet 22c respectively attached at positions corresponding thereto, respectively form first, second, and third drive mechanisms driving the moving frame 14 relative to the fixed plate 12.

In addition, as shown in FIG. 1, the anti-vibration actuator 10 has a controller 36, being a control section for controlling the current sourced to first, second, and third drive coils 20a, 20b, and 20c based on the vibration detected by the gyro 34 and on position information for the moving frame 14 detected by first, second, and third magnetic sensors 24a, 24b, and 24c.

The anti-vibration actuator 10 moves the moving frame 14 translationally relative to the fixed plate 12 affixed to the lens barrel 6 within a plane parallel to the film surface F, and is thus driven in such a way that images formed on the film surface F are not distorted even when the image stabilizing lens 16 attached to the moving frame 14 is moved and the lens barrel 6 vibrates.

As shown in FIG. 4, the moving frame 14 has an approximately flat donut shape, with the image stabilizing lens 16 attached at the center opening thereof. First, second, and third drive coils 20a, 20b, and 20c are disposed on the moving frame 14. As shown in FIG. 3, the centers of these three drive coils are respectively disposed on the circumference of a circle centered on the optical axis A of the lens unit 2. In the present embodiment, the second drive coil 20b is disposed vertically below the optical axis, and the first drive coil 20a, second drive coil 20b, and third drive coil 20c are disposed at equal spacing, separated by a center angle of approximately 120°.

The windings on the first, second, and third drive coils 20a, 20b, and 20c are respectively wound in an approximately rectangular shape with rounded corners, and one of the center lines thereof is disposed to face in a direction tangential to a circle centered on the optical axis.

As shown in FIG. 3, the fixed plate 12 is an approximately donut-shaped flat member, and the moving frame 14 is disposed parallel to the fixed plate 12. First, second, and third drive magnets 22a, 22b, and 22c are respectively disposed at positions facing the first, second, and third drive coils 20a, 20b, and 20c on the perimeter of the fixed plate 12. The first, second, and third drive magnets 22a, 22b, and 22c are approximately rectangular, and are disposed such that the center line crossing the long sides thereof is oriented in a direction radial to a circle centered on the optical axis of lens unit 2.

First, second, and third drive magnets 22a, 22b, and 22c are magnetized so that the centerline crossing the long sides thereof is a magnetic polarity boundary line C. Each drive magnet is therefore distributed so that the magnetic polarity boundary line C thereof faces in the radial direction of a circle centered on the optical axis A. Thus when current flows in the mutually facing first drive coil 20a and first drive magnet 22a, drive force is generated in a direction tangential to a circle centered on the optical axis A. Similarly, a drive force is also generated in a direction tangential to a circle centered on the optical axis A between a second drive coil 20b and a second drive magnet 22b, and between a third drive coil 20c and a third drive magnet 22c.

Note that in the present Specification "magnetic polarity boundary line C" refers to the line connecting the points at which the S pole changes to an N pole when the two ends of the drive magnets are respectively an S pole and an N pole. Also, as shown in FIG. 3, the magnetic polarity boundary line C in each drive magnet is positioned to pass through the center point of each long side of the rectangular drive magnet, while as shown in FIG. 2, the drive magnet changes polarity in the thickness direction thereof as well. Therefore in FIG. 3 an N pole is formed on the reverse side of the part shown as an S pole, and an S pole is formed on the reverse side of the part shown as an N pole.

As shown in FIGS. 2 and 3, the three steel balls 18 are sandwiched between the affixing plate 12 and the moving frame 14, each separated by a center angle of 120° on the perimeter of a circle centered on optical axis A. Indentations 30 are formed on the fixed plate 12 at positions corresponding to each of the steel balls 18. Also, indentations 31 are formed on the moving frame 14 at positions corresponding to the steel balls 18. Each of the steel balls 18 is disposed within these indentations 30, 31; dislodging is thus prevented. As described below, the moving frame 14 is pulled by the drive magnet to the affixing plate 12, so that steel balls 18 are constrained between the affixing plate 12 and the moving frame 14. The moving frame 14 is thus supported on a plane parallel to the fixed plate 12, and translational movement and rotational movement in any desired direction of the moving frame 14 relative to the fixed plate 12 is permitted by the rolling of the steel balls 18 as they are constrained.

As shown in FIGS. 2 and 4, first magnetic sensor 24a, second magnetic sensor 24b, and third magnetic sensor 24c are respectively disposed on the inside of each drive coil to measure the displacement of each drive coil in the circumferential direction. The position to which the moving frame 14 translationally and rotationally moves relative to fixed plate 12 can be identified based on signals detected by the first, second, and third magnetic sensors 24a, 24b, and 24c. In the present embodiment a Hall element is used as the magnetic sensor.

The back yoke 28 is approximately donut shaped, and is disposed on the opposite side from the moving frame 14 relative to the fixed plate 12. The magnetic flux of each drive magnet is efficiently directed toward the moving frame 14 by the back yoke 28.

As shown in FIG. 5, the pulling yoke 26 is approximately donut shaped, and is attached on the opposite side to that of the moving frame 14 drive coil. In addition, three expansion portions 26a are respectively formed at the parts of the pulling yoke 26 corresponding to the drive coils 20a, 20b, and 20c, covering the rear surface sides of the drive coils 22a, 22b, and 22c. The moving frame 14 is pulled to the fixed plate 12 by the magnetic force exerted by the drive magnets 22a, 22b, and 22c on this pulling yoke 26. Furthermore, two each of through holes 26b, being magnetic force suppression cutouts, are respectively disposed on each expansion portion 26a at positions overlapping each drive coil 20a, 20b, and 20c. Note that in the present Specification the phrase "through holes are provided at positions overlapping each drive coil" means that through holes are provided in the region projected in the direction of optical axis A relative to the pulling yoke 26.

In FIGS. 3 and 4 the position at which each through hole 26b is projected in the direction of optical axis A is shown by an imaginary line. As shown by the imaginary line in FIG. 3, the two through holes 26b respectively formed at the expansion portions 26a are disposed in a row in the radial direction of a circle centered on the optical axis A so as to follow the magnetic polarity boundary line C of the drive magnets 22a, 22b, and 22c. In addition, as described above, the lines of action of the drive force generated between the drive magnets 22a, 22b, and 22c facing the drive coils 20a, 20b, and 20c are directed in a direction tangential to a circle centered on optical axis A, therefore the two through holes 26b respectively formed on the expansion portions 26a can be disposed along a straight line perpendicular to the drive force line of action (the straight line in the radial direction of a circle centered on optical axis A).

Furthermore, as shown in FIG. 4, the two through holes 26b respectively formed on the expansion portions 26a are provided at positions overlapping the drive coils 20a, 20b, and 20c, and at positions not overlapping the magnetic sensors 24a, 24b, and 24c. Here the magnetic force lines formed by the drive magnets 22a, 22b, and 22c are formed from the drive magnet N poles through the mutually facing drive coils, the pulling yoke 26, and the drive coils, returning to the drive magnet S poles. A portion of the magnetic force line passing through the pulling yoke 26 is impeded by the through holes 26b provided on the pulling yoke 26. However because no through holes 26b are provided at positions overlapping the magnetic sensors, there is no major magnetic weakening in the vicinity of the magnetic sensors; each magnetic sensor can sufficiently detect the magnetism of each drive magnet, and the amount of movement of each drive magnet can be detected with high sensitivity.

Thus by providing through holes 26b, being magnetic force suppressing cutout portions, on the pulling yoke 26, the magnetic force with which the drive magnets 22a, 22b, and 22c pull the moving frame 14 in the optical axis A direction can be restrained to an appropriate size. The magnetic force acting between the drive magnets 22a, 22b, 22c and the pulling yoke 26 includes a component in the direction perpendicular to the optical axis A, and when the moving frame 14 is moved within a plane perpendicular to the optical axis A, this force component acts to return the moving frame 14 to its initial position (the position at which the magnetic polarity boundary lines between each magnetic sensor and each drive magnet are overlapping). By providing through holes 26b on the pulling yoke 26, this type of magnetic force in a direction perpendicular to the optical axis A can be greatly restrained.

Next we discuss control of an anti-vibration actuator 10 according to a first embodiment of the present invention.

Vibration of the lens unit 2 is detected moment by moment by the gyro 34 and input to the controller 36. A computation circuit (not shown) built into the controller 36 generates a lens position command signal which commands as a time sequence the position to which the image stabilizing lens 16 is to be moved, based on an angular velocity input from moment to moment from the gyro 34. By moving the image stabilizing lens 16 from moment to moment in accordance with the lens position command signal thus obtained, images focused on the film surface F in the camera body 4 are stabilized even if the lens unit 2 vibrates during exposure of a photograph.

The controller 36 controls the current sourced to the first, second, and third drive coils 20a, 20b, and 20c so that the image stabilizing lens 16 is moved to the position instructed by the lens position command signal generated by the computation circuit (not shown).

The controller 36 sources to each of the drive coils 20 a current proportional to the difference between the amount of movement of each drive coil relative to each drive magnet measured by each magnetic sensor, and the lens position command signal. Therefore when there is no longer a difference between the position of the lens commanded by the lens position command signal and the positions detected by each magnetic sensor, current ceases to flow to each drive coil, and the drive force acting on each drive coil becomes zero.

Next, referring to FIG. 1, we discuss the action of camera 1 according to a first embodiment of the present invention. First, the anti-vibration actuator 10 provided on the lens unit 2 is activated by turning on a switch for the camera 1 antishake function (not shown). A gyro 34 attached to the lens unit 2 detects vibration in a predetermined frequency band from moment to moment, outputting this to a computation circuit (not shown) built into the controller 36. The gyro 34 outputs an angular velocity signal to the computation circuit, and the computation circuit time-integrates the inputted angular velocity signal, calculates a shake angle, and adds a predetermined modifying signal to this to generate a lens position command signal. By moving the image stabilizing lens 16 moment by moment to a position commanded by a lens position command signal output in a time sequence by the computation circuit, images focused on the film surface F of the camera main unit 4 are stabilized.

The controller 36 sources a current to each drive coil responsive to the difference between the detected signal on each of the magnetic sensors and the lens position command signals in each direction. A magnetic field proportional to the current is generated when current flows in the drive coils. As a result of this magnetic field, the first, second, and third drive coils 20a, 20b, and 20c disposed to correspond to the first, second, and third drive magnets 22a, 22b, and 22c respectively receive a drive force, moving the moving frame 14. Magnetic force in a direction perpendicular to the optical axis A acting between the drive magnets 22a, 22b, 22c, and the pulling yoke 26, which becomes an interference to control of the moving frame 14, is restrained by the through holes 26b provided on the pulling yoke 26. When the moving frame 14 is moved by the drive force and each drive coil reaches a position designated by the lens position command signal, the drive force goes to zero. If the moving frame 14 departs from the position designated by the lens position command signal due to an external disturbance, or to changes in the lens position command signal or the like, current again flows in the drive coils, and the moving frame 14 is returned to a position designated by the lens position command signal.

By continuously repeating the aforementioned operation at close intervals, the image stabilizing lens 16 attached to the moving frame 14 is moved so as to follow the lens position command signal. The image focused on the film surface F of the camera main body 4 is thus stabilized.

Using the camera 1 of a first embodiment of the present invention, magnetic force received from the drive magnets by the through holes 26b, being magnetic force suppressing cutout portions, is suppressed, therefore magnetic force acting between the drive magnets and the pulling yoke 26 can be suppressed while avoiding an increase in the size of the anti-vibration actuator 10. I.e., the magnetic force acting between the drive magnets and the pulling yoke 26 can also be suppressed by disposing the pulling yoke 26 at a position greatly separated from the drive magnets, but when configured in that way the anti-vibration actuator 10 is enlarged in the optical axis A direction. According to the present embodiment, the magnetic force received from the drive magnets can be properly suppressed while avoiding such enlargement.

In the camera 1 of the present embodiment, the through holes 26b are provided at a position not overlapping the magnetic sensors 24a, 24b, and 24c, therefore position detection with good sensitivity by the magnetic sensor can be performed without major suppression of the magnetism which the magnetic sensor is to detect.

Moreover, in the camera 1 of the present embodiment, the through holes 26b are provided along a straight line perpendicular to the drive force line of action, therefore magnetic force acting in the direction of the drive force within a plane perpendicular to the optical axis A can be effectively suppressed, and interference relative to control of the moving frame 14 can be reduced.

In the camera 1 of the present embodiment, the through holes 26b are placed along the magnetic polarity boundary line C of the drive magnets, therefore the portion at which a strong magnetic field is easily formed within the pulling yoke 26 is cut away, and magnetic force can be effectively suppressed.

Furthermore, in the present embodiment of the camera 1 the magnetic force suppressing cutout portions re constituted by multiple through holes, therefore the magnetic force suppressing cutout portions along the magnetic polarity boundary lines C of the drive magnet can be formed by simple machining.

Next, referring to FIGS. 6 through 9, we discuss a camera according to a second embodiment of the present invention. In a camera according to this embodiment, the structure of the built-in oscillating actuator differs from that of the above-described first embodiment. Therefore we will explain only those points in the present embodiment which differ from the first embodiment, and will omit discussion of similar constitutions, operation, or effects.

Figure 6:
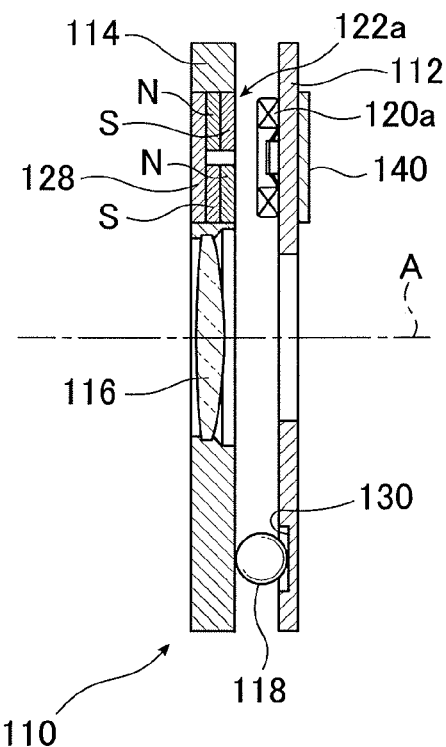
FIG. 6 A side elevation cross section of an anti-vibration actuator according to a second embodiment of the present invention.
Figure 7:
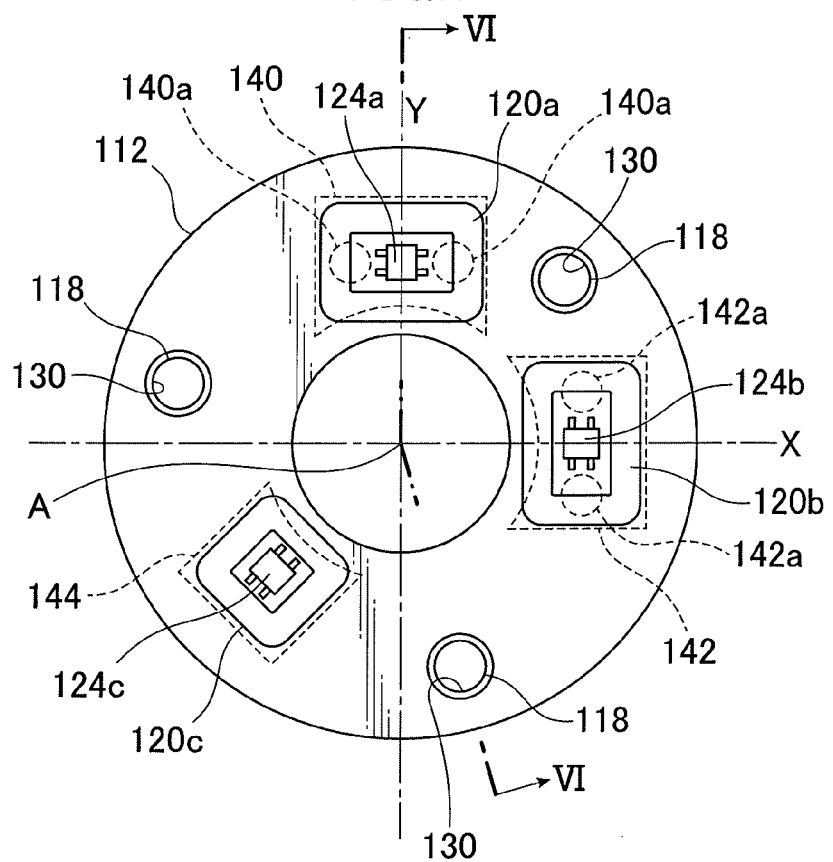
FIG. 7 A front elevation diagram in which the movable portion of the anti-vibration actuator is removed.
Figure 8:
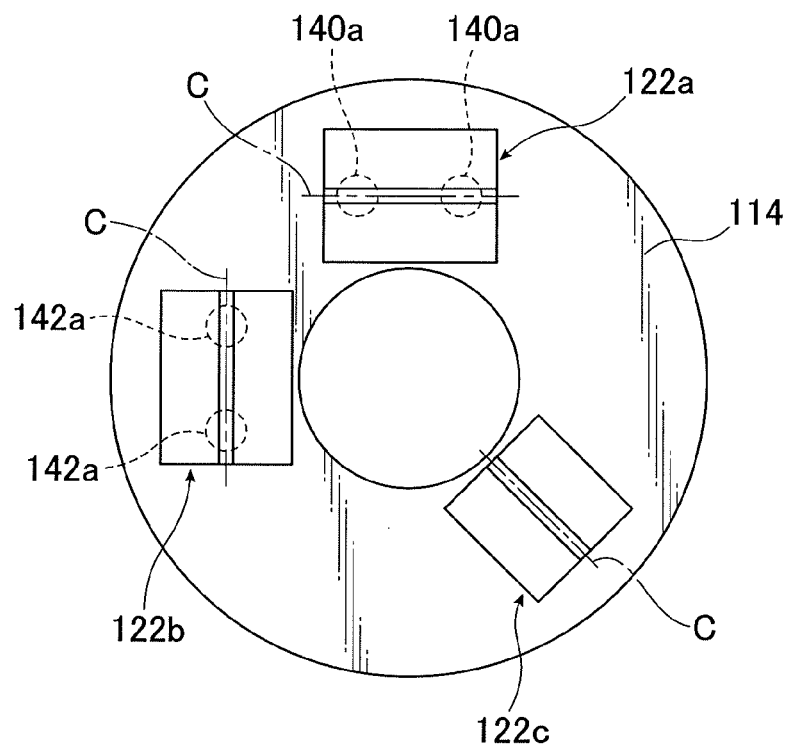
FIG. 8 A rear elevation diagram in which the movable portion of the anti-vibration actuator is seen from the fixed portion side.
Figure 9:
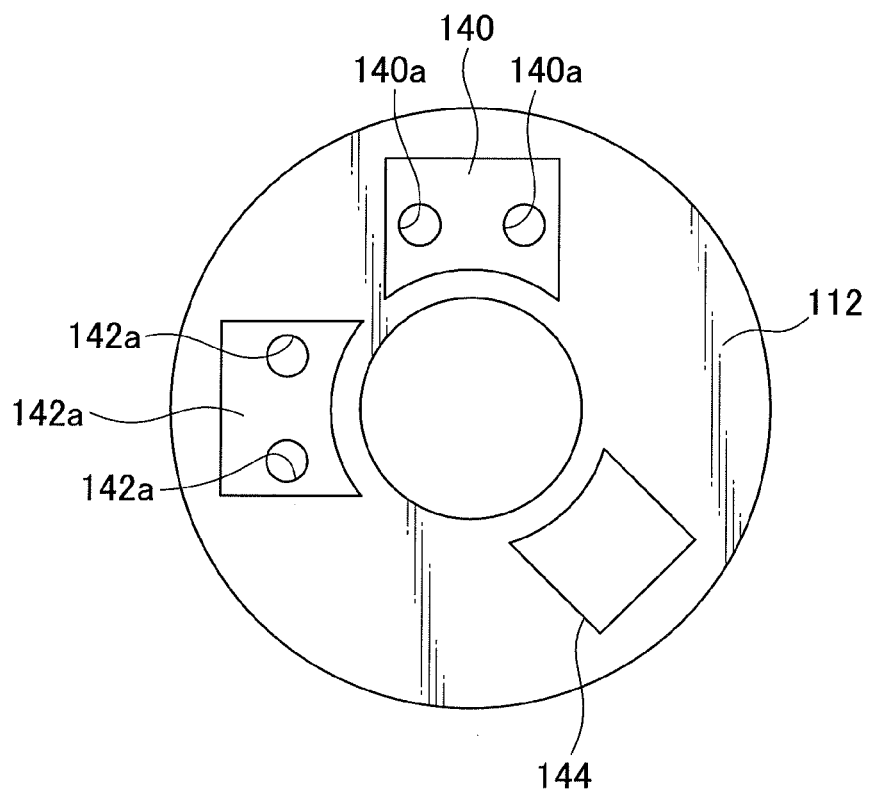
FIG. 9 A rear elevation showing the back side of the fixed portion.

FIG. 6 is a side elevation cross section of an anti-vibration actuator 110 according to a second embodiment of the present invention. FIG. 7 is a front elevation showing the state in which the movable portion of the anti-vibration actuator 110 has been removed; FIG. 8 is a rear elevation of the movable portion of the anti-vibration actuator 110 viewed from the side of the fixed plate. In addition, FIG. 9 is a rear elevation showing the reverse side of the fixed plate. Note that FIG. 6 is a cross section showing the state in which the anti-vibration actuator 110 has been sliced along the line VI-VI in FIG. 7.

As shown in FIGS. 6 through 9, the anti-vibration actuator 110 has an affixing plate 112, being a fixed portion affixed within the lens barrel, a moving frame 114, being a movable portion, supported so as to be translationally and rotationally movable with respect to the affixing plate 112, and three steel balls 118, being movable portion supporting member for supporting the moving frame 114. In addition, the anti-vibration actuator 110 has a first drive coil 120a, second drive coil 120b, and third drive coil 120c attached to fixed plate 112; a first drive magnet 122a, second drive magnet 122b, and third drive magnet 122c attached to the moving frame 114 so as to face the first drive coils 120a, 120b, and 120c; and a first magnetic sensor 124a, second magnetic sensor 124b, and third magnetic sensor 124c, being first, second, and third position detecting elements, respectively disposed inside each of the drive coils 120a, 120b, and 120c Also, the anti-vibration actuator 110 has three pulling yokes 140, 142, and 144 attached to the reverse side of the fixed plate 112 for pulling the moving frame 114 to the fixed plate 112 using the magnetic force of each drive magnet, and a back yoke 128 attached to the back side of each drive magnet for effectively directing the magnetic force of each drive magnet toward the fixed plate 112. Note that the first drive coil 120a, second drive coil 120b, and third drive coil 120c, and the first drive magnet 122a, second drive magnet 122b, and third drive magnet 122c respectively attached at positions corresponding thereto, respectively form first, second, and third drive mechanisms driving the moving frame 114 relative to the fixed plate 112.

Furthermore the anti-vibration actuator 110 has a controller (not shown), being a control section for controlling the amount of current sourced to first, second, and third drive coils 120a, 120b, and 120c based on the vibration detected by a gyro (not shown) and on position information for the moving frame 114 detected by the first, second, and third magnetic sensors 124a, 124b, and 124c.

The fixed plate 112 has an approximately donut shape, and the first, second, and third drive coils 120a, 120b, and 120c are disposed thereon. As shown in FIG. 7, the centers of these three drive coils are respectively disposed on the circumference of a circle centered on the optical axis of the lens unit 2. In the present embodiment, the first drive coil 120a is disposed vertically above the optical axis; the second drive coil 120b is disposed in a horizontal direction relative to the optical axis; and the third drive coil 120c is disposed at a position respectively separated by a center angle of 135° from the first drive coil 120a and the second drive coil 120b. Therefore the first drive coil 120a and second drive coil 120b are separated by a center angle of 90°, the second drive coil 120b and third drive coil 120c are separated by a center angle of 135°, and the third drive coil 120c and first drive coil 120a are separated by a center angle of 135°.

The windings of the first, second, and third drive coils 120a, 120b, and 120c are respectively wound in a rectangular shape with rounded corners. The first, second, and third drive coils 120a, 120b, and 120c are approximately rectangular, and the center lines crossing the long sides thereof are disposed to respectively match the Y and X axes. I.e., in the first and second drive coils 120a and 120b the length in the circumferential direction of the circle centered on the optical axis A of the image stabilizing lens is longer than the length thereof in the radial direction, and the long side thereof is oriented in a direction tangential to the circle. Also, the third drive coil 120c has an approximately rectangular shape, smaller than the first and second drive coils, and the center line crossing the short side thereof is disposed to face in the radial direction of a circle centered on the optical axis A.

As shown in FIG. 8, the moving frame 114 has an approximately donut shaped form, and is disposed in parallel with the fixed plate 112 to overlap the fixed plate 112. An image stabilizing lens 116 is attached at the center opening of the moving frame 114. First, second, and third drive magnets 122a, 122b, and 122c are respectively disposed at positions facing the first, second, and third drive coils 120a, 120b, and 120c on the perimeter of the moving frame 114. In the first embodiment described above, each drive magnet comprised a single magnet, but in this embodiment each drive magnet comprises two magnets. As shown in FIG. 6, a drive magnet 122a comprises two elongated rectangular magnets in which magnetic polarity changes over the thickness direction of the moving frame 114. In the present embodiment, the magnet disposed on the upper side of FIG. 6 is magnetized to an S polarity on the surface facing the drive coil, and to an N polarity on the rear surface thereof, and the magnet disposed to face downward is magnetized to an N polarity on the surface facing the drive coil, and to an S polarity on the rear surface thereof. Similarly, second and third drive magnets 122b and 112c also comprise two magnets.

First and second drive magnets 112a and 122b are disposed so that center lines crossing the long sides thereof respectively match the Y axis and X axis. Furthermore, as shown in FIG. 8, the center line crossing the short sides of first and second drive magnets 112a and 122b, i.e., the straight line passing between the two elongated magnets, is constituted to form a magnetic polarity boundary line C.

Also, the third drive coil 120c has an approximately rectangular shape, smaller than the first and second drive magnets, and a center line crossing the long sides thereof is placed to match the radial direction of a circle. On the other hand, as shown in FIG. 8, the third drive magnet 122c comprises two elongated magnets disposed to extend in the radial direction of a circle centered on optical axis A. Therefore the magnetic polarity boundary line C in the third drive magnet 122c is oriented in the radial direction of the circle. Thus the first and second drive magnets 122a and 122b are placed so that magnetic polarity boundary line C faces a line tangential to a circle centered on optical axis A, and third drive magnet 122c is placed so that the magnetic polarity boundary line C faces in the radial direction of that circle.

By being thus magnetized, the first and second drive magnets 122a and 122b primarily exert magnetism on the long side portions of rectangular first and second drive coils 120a and 120b. Thus when current flows in the first drive coil 120a, a drive force is generated in the vertical direction along the Y axis between drive coil 120 and the first drive magnet 122a, and when current flows in the second drive coil 120b, drive force is generated in the horizontal direction along the X axis between the drive coil 120b and the second drive magnet 122b.

I.e., the line of action of the drive force arising from the first drive means constituted by the first drive coil 120a and the first drive magnet 122a is directed in approximately a radial direction of the image stabilizing lens 116, and the line of action of the drive force arising from the second drive means constituted by the second drive coil 120b and the second drive magnet 122b is directed in approximately a radial direction of the image stabilizing lens 116, approximately perpendicular to the line of action of the magnetic force arising from the first drive means.

At the same time, as shown in FIG. 8, the third drive magnet 122c is placed so that the magnetic polarity boundary line C faces in a radial direction of a circle centered on optical axis A. Therefore when current flows in the third drive coil 120c, a drive force is generated between the third drive coil 120c and the third drive magnet 122c in a direction tangential to a circle centered on optical axis A. Because the third drive coil 120c and third drive magnet 122c constituting the third drive means are constituted to be smaller than the first and second drive coils and the first and second drive magnets, the drive force generated by the third drive means when the same current flows in the drive coil is smaller than the drive force generated by the first and second drive means.

As shown in FIGS. 6 and 7, the three steel balls 118 are constrained between the affixing plate 112 and the moving frame 114, each separated by a center angle of 120° on the perimeter of a circle centered on optical axis A. Indentations 130 are formed on the fixed plate 112 to correspond to each of the steel balls 118, and each steel ball 118 is placed within an indentation 130, thereby preventing the steel balls from falling out. The moving frame 114 is pulled by the drive magnet to the affixing plate 112 so that each steel ball 118 is constrained between the affixing plate 112 and the moving frame 114. The moving frame 114 is thus supported on a plane parallel to the fixed plate 112, and translational movement and rotational movement in any desired direction of the moving frame 114 relative to the fixed plate 112 is permitted by the rolling of the steel balls 118 as they are constrained.

In the present embodiment steel spherical bodies are used as the steel balls 118, but the steel balls 118 do not necessarily have to be spherical bodies. I.e., if the part of the anti-vibration actuator 110 which contacts the fixed plate 112 and the moving frame 114 during operation has an approximately spherical surface shape, it can be used as a steel ball 118. Note that in the present specification this form is referred to as a "spherical body." The spherical body may also be constituted of non-steel metals, or of resin, etc.

Back yokes 128 are approximately rectangular in shape, and are respectively let into the moving frame 114 so as to cover the rear surface (the side not facing the drive coil) of the drive magnet. The magnetic flux of each drive magnet is efficiently directed toward the fixed plate 112 by these back yokes 128.

In the present embodiment, as shown in FIG. 9, three pulling yokes are provided for each drive coil. These first, second, and third pulling yokes 140, 142, and 144 are approximately rectangular, and are respectively attached to the reverse sides of first, second, and third drive coils 120a, 120b, and 120c. The moving frame 114 is pulled to the fixed plate 112 by the magnetic force exerted by the drive magnets on these pulling yokes 140, 142, and 144. There are also two through holes 140a, being magnetic force suppressing cutout portions, disposed on the first pulling yoke 140, and two through holes 142a, being magnetic force suppressing cutout portions, provided on the second pulling yoke 142.

In FIGS. 7 and 8, the position at which each through hole 140a and 142a is projected in the direction of optical axis A is shown by an imaginary line. As shown by the imaginary line in FIG. 8, the through holes 140a, 142a, two of each of which are formed on the first and second pulling yokes 140, 142 respectively, are disposed in a row in a direction tangential to a circle centered on optical axis A so as to follow the magnetic polarity boundary line C of the first and second drive magnets 122a, 122b. In addition, as described above, because the line of action of the magnetic force generated between the first and second drive coils 120a, 120b and the facing first and second drive magnets 122a, 122b is directed in the radial direction of the circle centered on optical axis A, the through holes 140a, 142a, two of each of which are formed in the first and second pulling yokes 140, 142 respectively, can be placed along a straight line (the straight line in a direction tangential to a circle centered on optical axis A) perpendicular to the line of action of the drive force.

As shown by the imaginary line in FIG. 7, the through holes 140a, 142, two each of which are formed on the first and second pulling yokes 140, 142, respectively, are provided at positions overlapping the first and second drive coils 120a, 120b, and are placed at positions not overlapping first and second magnetic sensors 124a, 124b. Thus because no through holes are provided at positions overlapping the magnetic sensors, there is no major magnetic weakening in the vicinity of the magnetic sensors; each magnetic sensor can sufficiently detect the magnetism of each drive magnet, and the amount of movement of each drive magnet can be detected with high sensitivity.

By providing through holes 140a, 142a, being magnetic force suppressing cutout portions, on the first and second pulling yokes 140, 142, the magnetic force by which the first and second drive magnets 122a, 122b pull the moving frame 114 in the direction of optical axis A can be suppressed to an appropriate magnitude. The third drive magnet 122c and third pulling yoke 144 are constituted to be smaller than the first and second drive magnets and the first and second pulling yokes, but by providing through holes 140a, 142a on the first and second pulling yokes 140, 142, the first, second, and third drive magnets 122a, 122b, and 122c are made approximately equal in magnetic force to the magnetic force by which the moving frame 114 is pulled. By this means the moving frame 114 can be pulled in a balanced manner, and the moving frame 114 can be smoothly moved. Since the pulling force created by each drive magnet is made equal, the thickness of the third pulling yoke 144 can be made different from the thickness of the first and second pulling yokes 140, 142.

By providing through holes 140a, 142a, the moving frame 114 can be moved within a plane perpendicular to the optical axis A, and magnetic force in the direction perpendicular to the optical axis A, which acts to pull the moving frame 114 back to its initial position (the position at which the magnetic polarity boundary lines of the magnetic sensors and the drive magnets overlap), can also be greatly suppressed.

Figure 10:
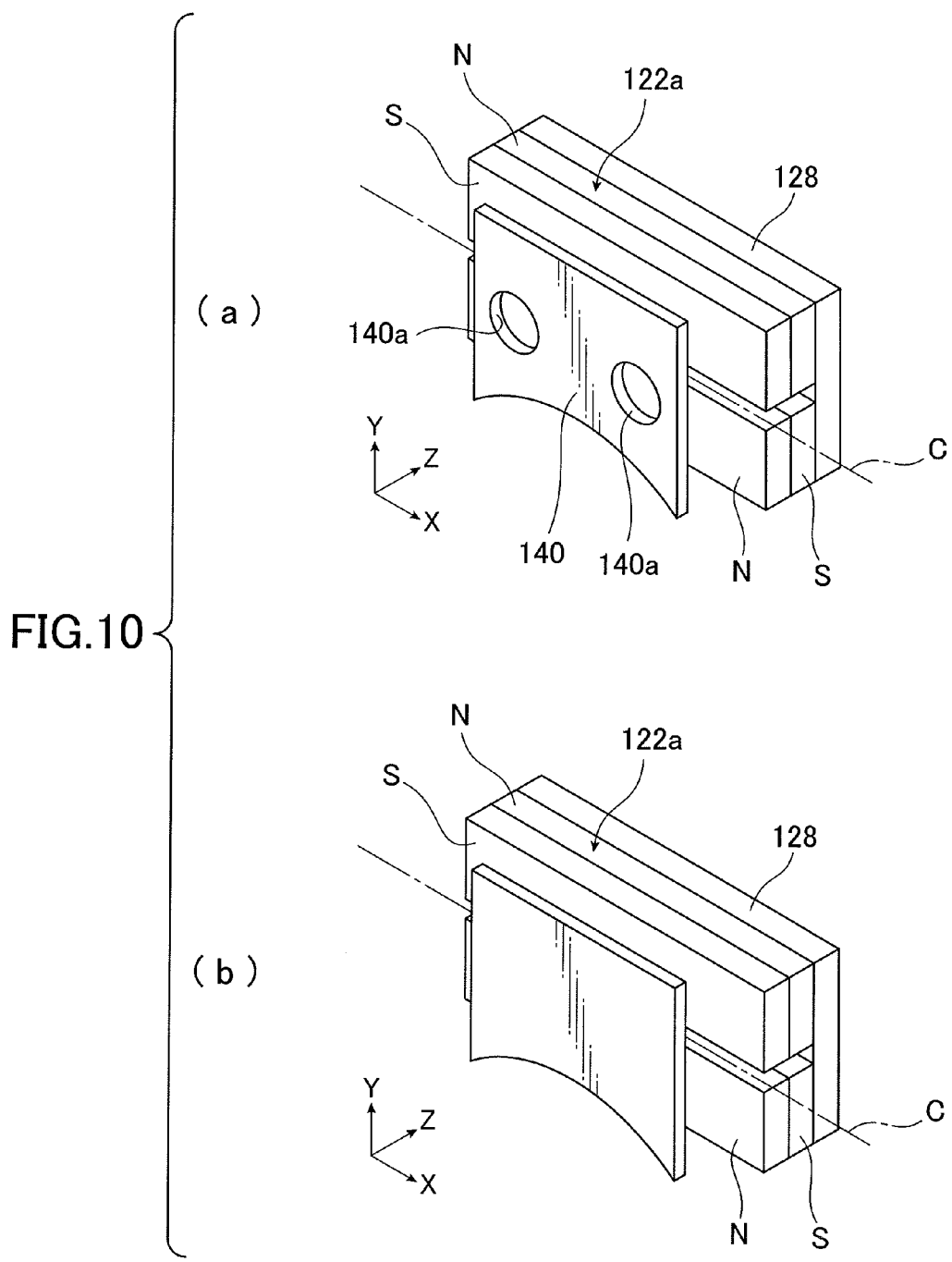
FIG. 10 A diagram showing a magnetic simulation model depicting the effect of the magnetic force suppressing cutout portion.

FIG. 10 is a diagram showing a magnetic simulation model depicting the effect of the magnetic force suppressing cutout portion. FIG. 10(a) is a diagram modeling the first drive magnet 122a and the first pulling yoke 140 in the present embodiment; FIG. 10(b) is a model in which, as a comparative example, no through holes are provided in the pulling yoke. Note that because the drive coil disposed between the drive magnet and the pulling yoke is simple, it is here omitted. We calculated the force by which the drive magnet pulls the drive yoke with magnetic simulation software using the models in FIGS. 10(a) and (b). The results are shown in Table 1.

TABLE 1

|  | Pulling Force X Component | Pulling Force Y Component | Pulling Force Z Component |
| --- | --- | --- | --- |
| Embodiment of the present invention FIG. 10(a) | $1.57 \times 10^{-5}$N | $3.51 \times 10^{-2}$N | 1.55N |
| Comparative Example FIG. 10(b) | $2.95 \times 10^{-4}$N | $9.97 \times 10^{-2}$N | 2.01N |

As shown in Table 1, in the FIG. 10(a) embodiment of the present invention, it was calculated that the Z axis (optical axis A) direction pulling force is 1.55N, the Y axis (direction of the drive force generated by the first drive coil 120a and the first drive magnet 122a) tensile force is $3.51 \times 10^{-2}$N, and the X axis direction tensile force is $1.57 \times 10^{-5}$N. At the same time, in the comparative example shown in FIG. 10(b), the Z axis (optical axis A) direction pulling force was calculated to be 2.01N, the Y axis direction tensile force $9.97 \times 10^{-2}$N, and the X axis direction tensile force $2.95 \times 10^{-4}$N. First, the Z axis force component, which is the largest force acting between the drive magnet and the pulling yoke, is suppressed by approximately 23% by providing a magnetic force suppressing cutout portion, and thereby adjusted to an appropriate size. Next, the X axis force component is far smaller than in both the present embodiment and the comparative example, and there is virtually no negative influence by this force on control of the moving frame 114. This is because even when the length of the pulling yoke in the X axis direction is shorter than the length of the drive magnet in the X axis direction, and the pulling yoke and drive magnet are moved relative to one another by a minute distance in the X axis direction, there is no major change in the distribution of magnetic field lines between them.

In the comparative example, on the other hand, when the pulling yoke and the drive magnets are moved relative to one another in the Y axis direction, a Y axis direction tensile force of $9.97 \times 10^{-2}$N is generated. This force is relatively large, and becomes an interference relative to the drive force generated between the first drive coil 120a and the first drive magnet 122a. In the present embodiment, in which two through holes 140a are provided in the pulling yoke 140, the tensile force in this Y axis direction becomes $3.51 \times 10^{-2}$N, which is an approximately 65% suppression compared to when no through holes 140a are provided. Thus in the present embodiment, magnetic force in the direction perpendicular to the optical axis A, which imparts a negative effect on the control of the moving frame 114, can be greatly suppressed by providing through holes, which are magnetic force suppressing cutout portions, in the pulling yoke.

Note that with respect to tensile force in the Y axis direction, as well, by making the Y axis length of the pulling yoke shorter than the Y axis length of the drive magnet, or by making the Y axis length of the pulling yoke longer than the Y axis length of the drive magnet, the tensile force with respect to relative movements of minute distances can be made small, as in the X axis direction. However when the pulling yoke and drive magnets are designed in this manner, the pulling yoke or drive magnet Y axis length must be made unnecessarily long relative to the required drive force. For this reason when such a design is adopted the problem arises that the outer diameter of the anti-vibration actuator expands. Using the camera of the present embodiment, interference with control of the moving frame 114 can be effectively suppressed while avoiding an enlargement of the anti-vibration actuator 110.

Using the camera according to a second embodiment of the present invention, through holes 140a, 142a, which are magnetic force suppressing cutout portions, are provided on only on a portion of the pulling yokes 140, 142 among the multiple pairs of drive magnets and pulling yokes, therefore even when the magnetic forces arising from the drive magnets 122a, 122b differ, the pulling force can be easily made uniform, and the moving frame 114 can be smoothly moved.

We have thusfar explained preferred embodiments of the present invention above, but various changes may be made to the above-described embodiments. In particular, in the embodiment described above the present invention was applied to a film camera, but the present invention may also be applied to any desired still or moving image capturing camera, such as a digital camera, a video camera, or the like. The present invention may also be applied to lens units used together with the camera bodies of such cameras.

Furthermore, in the above-described embodiments the moving frame was supported by steel balls, but any desired means may be used as a movable portion supporting member for movably supporting the moving frame. In particular, steel ball support requires pulling of the moving frame, but the present invention may also be applied to an anti-vibration actuator furnished with a support means which does not require pulling the moving frame. I.e., magnetic force suppressing cutout portions may be provided not only on pulling yokes such as that in the present embodiment, but also on yokes for simply forming a magnetic circuit.

Figure 11:
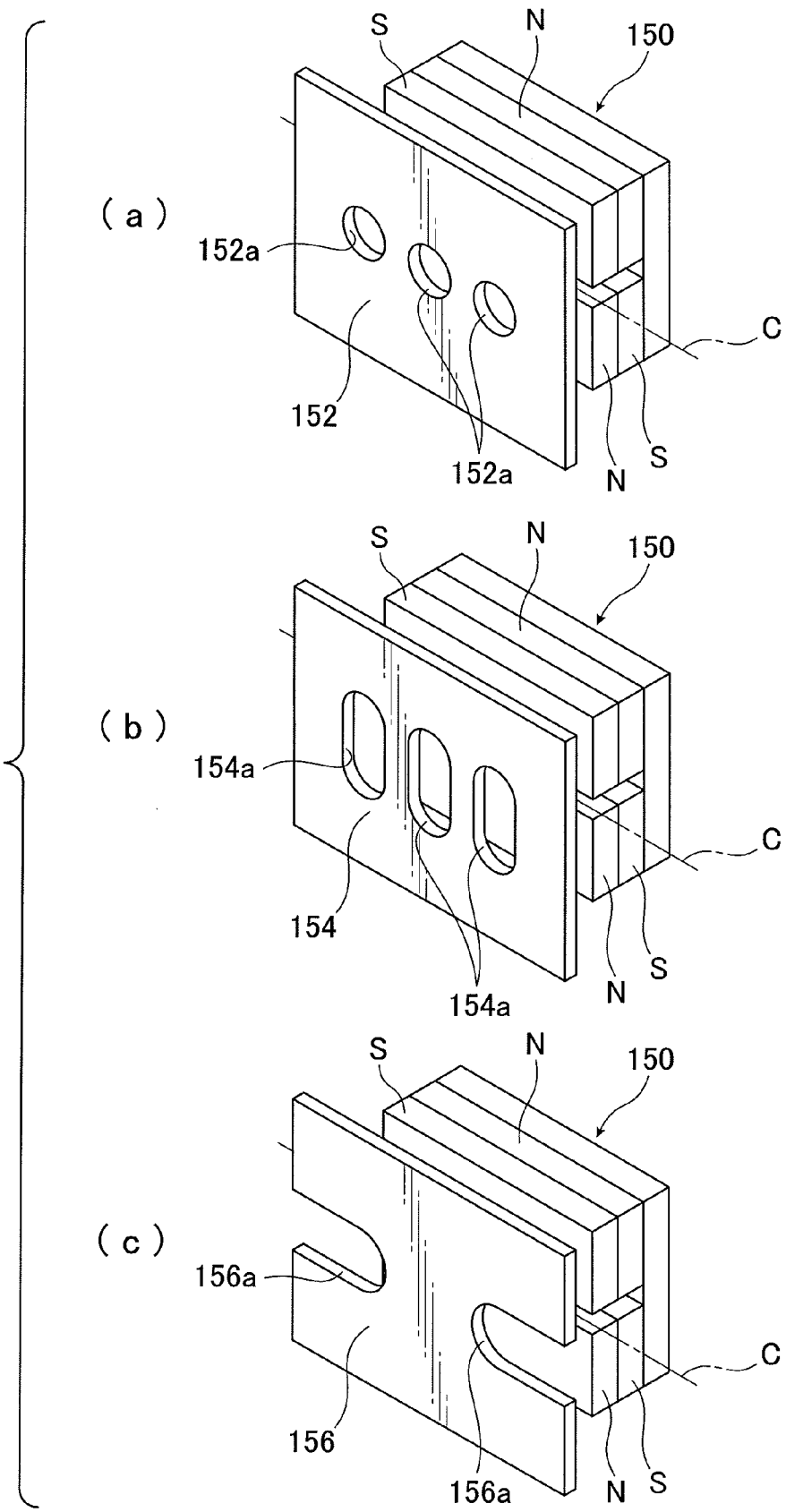
FIG. 11 A diagram showing a variant example of a magnetic force suppressing cutout portion.

Also, in the above-described embodiment, two circular through holes disposed along the magnetic polarity boundary line C were provided as magnetic force suppressing cutout portions, but as a variant example magnetic force suppressing cutout portions such as shown in FIG. 11 may also be provided. Note that in FIG. 11 as well, the diagram omits illustration of the drive coil positioned between the drive magnet and the pulling yoke.

In the variant example shown in FIG. 11(*a*), three circular through holes 152*a* are provided as magnetic force suppressing cutout portions on a pulling yoke 152, and these through holes 152*a* are disposed along the magnetic polarity boundary line C of a drive magnet 150.

In the variant example shown in FIG. 11(*b*), three oval through holes 154*a* are provided as magnetic force suppressing cutout portions on a pulling yoke 154, and these through holes 154*a* are disposed along the magnetic polarity boundary line C of drive magnet 150. In this variant example, the through holes 154*a* are placed in a row along the magnetic polarity boundary line C, but the through holes themselves extend in a direction perpendicular to the magnetic polarity boundary line C.

In the variant example shown in FIG. 11(*c*), two cutout portions 156*a* are provided on a pulling yoke 156, and cutout portions 156*a* are formed from both sides of the pulling yoke 156 so as to extend along the magnetic polarity boundary line C of the drive magnet 150.

EXPLANATION OF REFERENCE NUMERALS

1: Camera according to a first embodiment of the present invention.
2: Lens unit
4: Camera main unit
6: Lens barrel
8: Imaging lens
10: Anti-vibration actuator
12: Fixed plate (fixed portion)
14: Moving frame
16: Image stabilizing lens
18: Steel balls (movable portion supporting member)
20*a*: First drive coil
20*b*: Second drive coil
20*c*: Third drive coil
22*a*: First drive magnet
22*b*: Second drive magnet
22*c*: Third drive magnet
24*a*: First magnetic sensor (first position detection element)
24*b*: Second magnetic sensor (second position detection element)
24*c*: Third magnetic sensor (third position detection element)
26: Pulling yoke (yoke)
26*a*: Expansion portion
26*b*: Through holes (magnetic force suppressing cutout portions)
28: Back yoke
30: Indentation
31: Indentation
34: Gyro
36: Controller (control section)
110: Anti-vibration actuator in a second embodiment of the present invention
112: Fixed plate 112 (fixed portion)
114: Moving frame (moving portion)
116: Image stabilizing lens
118: Steel balls (movable portion supporting member)
120*a*: First drive coil
120*b*: Second drive coil
120*c*: Third drive coil
122*a*: First drive magnet
122*b*: Second drive magnet
122*c*: Third drive magnet
124*a*: First magnetic sensor (first position detection element)
124*b*: Second magnetic sensor (second position detection element)
124*c*: Third magnetic sensor (third position detection element)
128: Back yoke
140: First pulling yoke (yoke)
140*a*: Through holes (magnetic force suppressing cutout portions)
142: First pulling yoke (yoke)
142*a*: Through holes (magnetic force suppressing cutout portions)
144: Third pulling yoke (yoke)
150: Drive magnets
152: Pulling yoke (yoke)
152*a*: Through holes (magnetic force suppressing cutout portions)
154: Pulling yoke (yoke)
154*a*: Through holes (magnetic force suppressing cutout portions)
156: Pulling yoke (yoke)
156*a*: Cutout portions (magnetic force suppressing cutout portions)

The invention claimed is:

1. An anti-vibration actuator for moving an image stabilizing lens, comprising:
    a fixed portion;
    a movable portion to which the image stabilizing lens is attached;
    a movable portion supporting member that supports the movable portion so that it is movable relative to the fixed portion within a plane perpendicular to the optical axis of the image stabilizing lens;
    drive coils attached to one of either the fixed portion or the movable portion;
    drive magnets attached to the other of either the fixed portion or the movable portion so as to respectively face the drive coils; and
    at least one yoke attached to the side of the drive coil not facing the drive magnet wherein the at least one yoke is made of a material attractable by a magnetic force, and the drive magnet exerts a magnetic force on the at least one yoke;
    wherein the at least one yoke includes magnetic force suppressing cutout portions formed in a position overlapping the drive coils in order to suppress magnetic force received from the drive magnet.

2. The anti-vibration actuator according to claim 1, further comprising a position detecting magnetic sensor disposed on the inner side of the drive coil, in which the magnetic force suppressing cutout portions are disposed in a position not overlapping the magnetic sensor.

3. The anti-vibration actuator according to claim 1, wherein the magnetic force suppressing cutout portions are provided along a straight line perpendicular to the line of action of the drive force acting between the corresponding drive coil and the drive magnet facing this drive coil.

4. The anti-vibration actuator according to claim 1, wherein each drive magnet has a magnetic polarity boundary line extending within a plane perpendicular to the optical axis of the image stabilizing lens, and the magnetic force suppressing cutout portions are provided along the magnetic polarity boundary lines of each drive magnet.

5. An anti-vibration actuator for moving an image stabilizing lens, comprising:
   a fixed portion;
   a movable portion to which the image stabilizing lens is attached;
   a movable portion supporting member that supports the movable portion so that it is movable relative to the fixed portion within a plane perpendicular to the optical axis of the image stabilizing lens;
   drive coils attached to one of either the fixed portion or the movable portion;
   drive magnets attached to the other of either the fixed portion or the movable portion so as to respectively face the drive coils; and
   at least one yoke attached to the side of the drive coil not facing the drive magnet;
   wherein the at least one yoke includes magnetic force suppressing cutout portions formed in a position overlapping the drive coils in order to suppress magnetic force received from the drive magnet;
   wherein each drive magnet has a magnetic polarity boundary line extending within a lane perpendicular to the optical axis of the image stabilizing lens, and the magnetic force suppressing cutout portions are provided along the magnetic polarity boundary lines of each drive magnet; and
   wherein the magnetic force suppressing cutout portions are constituted of multiple holes disposed along the magnetic polarity boundary line of each drive magnet.

6. An anti-vibration actuator for moving an image stabilizing lens, comprising:
   a fixed portion;
   a movable portion to which the image stabilizing lens is attached;
   a movable portion supporting member that supports the movable portion so that it is movable relative to the fixed portion within a plane perpendicular to the optical axis of the image stabilizing lens;
   drive coils attached to one of either the fixed portion or the movable portion;
   drive magnets attached to the other of either the fixed portion or the movable portion so as to respectively face the drive coils; and
   at least one yoke attached to the side of the drive coil not facing the drive magnet;
   wherein the at least one yoke includes magnetic force suppressing cutout portions formed in a position overlapping the drive coils in order to suppress magnetic force received from the drive magnet; and
   wherein at least two of the drive magnets are disposed so that the magnetic polarity boundary lines thereof extend in a direction tangential to a circle centered on the optical axis, and the magnetic force suppressing cutout portions are constituted by multiple holes disposed along a direction tangential to the circle so as to follow the magnetic polarity boundary line.

7. An anti-vibration actuator for moving an image stabilizing lens, comprising:
   a fixed portion;
   a movable portion to which the image stabilizing lens is attached;
   a movable portion supporting member that supports the movable portion so that it is movable relative to the fixed portion within a plane perpendicular to the optical axis of the image stabilizing lens;
   drive coils attached to one of either the fixed portion or the movable portion;
   drive magnets attached to the other of either the fixed portion or the movable portion so as to respectively face the drive coils; and
   at least one yoke attached to the side of the drive coil not facing the drive magnet;
   wherein the at least one yoke includes magnetic force suppressing cutout portions formed in a position overlapping the drive coils in order to suppress magnetic force received from the drive magnet; and
   wherein at least three of the multiple drive magnets are disposed so that the magnetic polarity boundary lines thereof extend in a direction radial to a circle centered on the optical axis, and the magnetic force suppressing cutout portions are constituted by multiple holes disposed along a direction radial to the circle so as to follow the magnetic polarity boundary line.

8. A lens unit furnished with an anti-vibration actuator, comprising:
   a lens barrel;
   an imaging lens disposed inside the lens barrel; and
   the anti-vibration actuator according to claim 1.

9. A camera furnished with an anti-vibration actuator, comprising:
   a camera main body; and
   the lens unit according to claim 8.

* * * * *